(12) United States Patent
Clark et al.

(10) Patent No.: US 10,034,357 B2
(45) Date of Patent: Jul. 24, 2018

(54) EXTERNAL WIRELESS MODULE FOR LIGHTING FIXTURE

(71) Applicant: Hubbell Incorporated, Shelton, CT (US)

(72) Inventors: Adam J. Clark, Bradenton, FL (US); Perry Romano, Bradenton, FL (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 15/493,555

(22) Filed: Apr. 21, 2017

(65) Prior Publication Data

US 2017/0311423 A1    Oct. 26, 2017

Related U.S. Application Data

(60) Provisional application No. 62/325,652, filed on Apr. 21, 2016.

(51) Int. Cl.
*H05B 37/02* (2006.01)
*H05B 33/08* (2006.01)

(52) U.S. Cl.
CPC ..... *H05B 37/0272* (2013.01); *H05B 33/0812* (2013.01); *H05B 33/0845* (2013.01); *H05B 37/0281* (2013.01); *H05B 33/0854* (2013.01)

(58) Field of Classification Search
CPC ............ H05B 37/0272; H05B 33/0845; H05B 33/0854
USPC ...................................... 315/185 R, 291, 308
See application file for complete search history.

(56) References Cited

U.S. PATENT DOCUMENTS

| 9,236,767 | B2 | 1/2016 | Recker et al. | |
| 9,338,839 | B2* | 5/2016 | Recker | H05B 33/0815 |
| 2015/0008827 | A1* | 1/2015 | Carrigan | H05B 33/0842 315/131 |
| 2015/0008831 | A1* | 1/2015 | Carrigan | H05B 33/0842 315/153 |
| 2015/0216017 | A1* | 7/2015 | Pratt | H05B 37/0227 315/291 |

FOREIGN PATENT DOCUMENTS

WO    WO 2015/128760    9/2015

OTHER PUBLICATIONS

PCT International Search Report for corresponding PCT Application No. PCT/US2017/28734, dated Jul. 6, 2017, 2 pages.

* cited by examiner

*Primary Examiner* — Thuy Vinh Tran
(74) *Attorney, Agent, or Firm* — Dority & Manning, P.A.

(57) ABSTRACT

An external wireless module for controlling a lighting fixture in a lighting system is provided. In one example implementation, an external wireless module for mounting to a lighting fixture includes a module housing. The module includes one or more electrical components located within the module housing. The one or more electrical components is configured to provide wireless control capability for the lighting fixture over a wireless network. The module housing is configured to be mounted to an exterior of a lighting fixture housing associated with the light fixture. The one or more electrical components are configured to be interfaced with one or more internal components of the lighting fixture located in an interior of the lighting fixture housing.

16 Claims, 6 Drawing Sheets

EXTERNAL WIRELESS MODULE FOR LIGHTING FIXTURE

PRIORITY CLAIM

The present application claims the benefit of priority of U.S. Provisional Application Ser. No. 62/325,652, titled "External Wireless Module for Lighting Fixture," filed Apr. 21, 2016, which is incorporated herein by reference.

FIELD

The present disclosure relate generally to lighting fixtures.

BACKGROUND

Lighting fixtures (e.g., luminaires) using light emitting diodes (LEDs) or other solid state lighting sources have in recent years become practical from the standpoint of cost, efficiency, durability, etc. For example, such lighting fixtures have penetrated the lighting market to some degree due to the increasing luminous efficacy of commercially available LED components. LED lighting fixtures are desirable as they offer customers energy savings due to good luminous efficacy combined with the ability to precisely control light distribution patterns, which is of particular importance for outdoor lighting scenarios. Another benefit of LED lighting fixtures is that with the right control mechanism the LEDs are controllable. Each LED lighting fixture can start-up (i.e., illuminate) on a near-instantaneous basis, and may be dimmed to any level by varying the current to each LED via dimming power supplies, (e.g. drivers).

Wireless control devices have been developed for solid state lighting fixtures. Such wireless control devices can include a control module and an antenna integrated within each lighting fixture. A user can control aspects of the lighting fixture via a remote computing device that interfaces with the lighting fixture via the wireless control device. In some instances, such wireless control devices have been integrated with the lighting fixture (e.g., coupled directly to the LED light engine or other component of the LED lighting fixtures). In some cases, wireless control of a lighting fixture may not have been contemplated during the original design of the LED lighting fixtures.

SUMMARY

Aspects and advantages of embodiments of the present disclosure will be set forth in part in the following description, or may be learned from the description, or may be learned through practice of the embodiments.

One example aspect of the present disclosure is directed to an external wireless module for mounting to a lighting fixture can include a module housing. The module can include one or more electrical components located within the module housing. The one or more electrical components can be configured to provide wireless control capability for the lighting fixture over a wireless network. The module housing can be configured to be mounted to an exterior of a lighting fixture housing associated with the light fixture. The one or more electrical components can be configured to be interfaced with one or more internal components of the lighting fixture located in an interior of the lighting fixture housing.

Other example aspects of the present disclosure are directed to lighting fixtures, lighting systems, apparatus, methods, and non-transitory computer-readable media for communicating information from a controller to a lighting fixture over a wireless network via an external wireless module.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
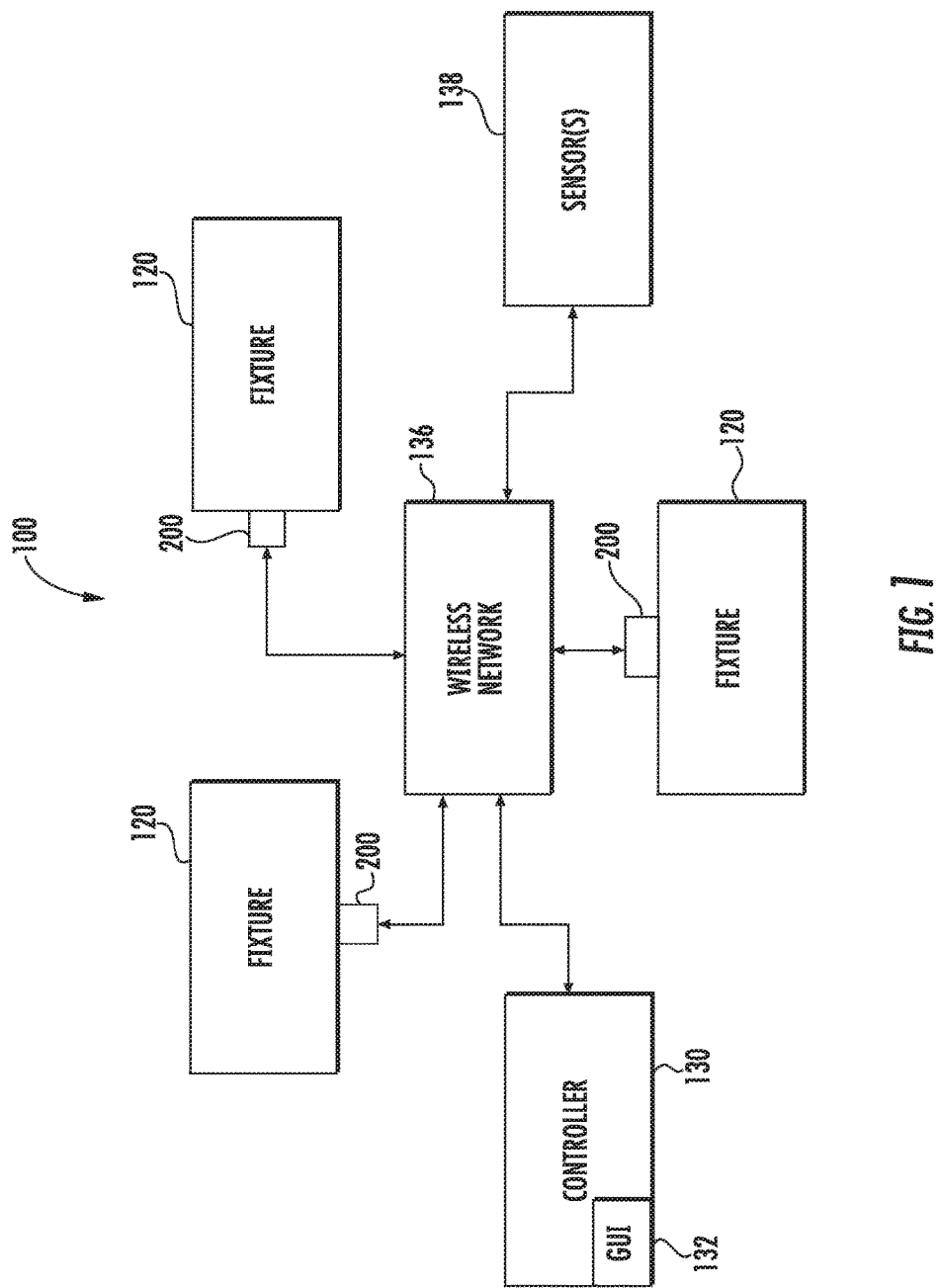
FIG. 1 depicts a block diagram of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to external wireless modules that can be interfaced with lighting fixtures to provide for wireless control of the lighting fixtures. More particularly, in some embodiments, an external wireless module can be engaged and/or interfaced with an external portion of an external housing of the lighting fixture (e.g., a lighting fixture housing). The components of the external wireless module can be coupled to one or more drivers and/or light engines within the lighting fixture housing. A user can control various aspects of the lighting fixture and/or can communicate information to and from the external wireless module over a wireless network from a computing device (e.g., a desktop laptop, smartphone, tablet, wearable device, display with one or more processors, etc.) via the external wireless module.

In particular implementations, the external wireless module can be installed with and/or retrofit with a lighting fixture that was not originally designed to support wireless communications. In this way, external wireless modules according to example aspects of the present disclosure can be used to adapt one or more lighting fixtures to convert a lighting system into a system adapted for wireless control capability. Each lighting fixture in the lighting system can be controlled via the external wireless module to provide for various lighting paradigms, such as lighting paradigms that can, for instance, independently activate, deactivate, and/or adjust (e.g., dim) the illumination of each lighting fixture depending upon certain conditions, such as the time of day, or motion through an active region.

In some embodiments, the external wireless module can include a module housing enclosing one or more circuit boards configured to provide wireless control capability. For instance, the external wireless module can include a first board that includes communication circuitry (e.g., one or more transmitters, receivers, transceivers, antenna, etc.) as well as one or more processors or other control circuitry (e.g., microprocessors, microcontrollers, application specific integrated circuits, etc.) for controlling the communication circuitry to provide wireless network capability and to transmit and receive wireless signals. The first board can further include components such as a real time clock, back-up battery, and other components to assist with adapting a lighting fixture for wireless control capability.

The external wireless module can further include a second board that is configured to receive a power supply from the lighting fixture (e.g., via suitable conductors) as well as generate control signals for operation of the driver circuit and/or light engine (or other solid state light source) of the lighting fixture (e.g., via one or more control conductors). The first board can be physically arranged in a generally perpendicular manner with respect to the second board and can be coupled to the second board through a suitable connector. In some embodiments, the second board can include one or more sensors (e.g., accelerometers, etc.) for use in wireless control of the lighting fixture.

The module housing of the external wireless module can include a first housing portion and a second housing portion. The first housing portion can have a shape to accommodate the first board. The first housing portion can be connected to the second housing portion via one or more fastening devices (e.g., screws, fasteners, etc.) such that the first housing portion can be separated from the second housing portion to access the internal components of the external wireless module (e.g., the first board and the second board).

In some embodiments, the second housing portion can be configured to be mechanically coupled, attached to, or interfaced with an external housing or other portion of the lighting fixture. For instance, in some embodiments, the second housing portion can include a nipple (e.g., a threaded nipple) configured to be engaged within a receiving recess in the external housing of the lighting fixture and secured with, for instance, a lock nut. In some embodiments, a gasket can be used on the underside of the second portion to facilitate engagement with the lighting fixture. Various conductors (e.g., wires) can be used to electrically couple the external wireless module to the electrical system associated with the lighting fixture. For instance, power conductors can be coupled to a power circuit associated with the lighting fixture to provide power (e.g., DC power) for the first board and the second board. One or more control conductors can be provided to the driver circuit to provide one or more lighting control signals (e.g., dimming control signals) to control illumination provided by the lighting fixture.

In some embodiments, a lighting system can include one or more lighting fixtures that can be arranged to illuminate a desired area or space. Each lighting fixture can include an LED light engine and an external wireless module mounted to an external surface of the lighting fixture for communicating with a controller (e.g., a computing device) using a wireless network. Example aspects of the present disclosure are discussed with reference to LED lighting fixtures including one or more LED devices (e.g., semiconductor devices that emit light as a result of movement of electrons through the semiconductor material) for purposes of illustration and discussion. Those of ordinary skill in the art, using the disclosures provided herein, will understand that example aspects of the present disclosure can be used with lighting fixtures that incorporate other light sources, such as incandescent, fluorescent, and other light sources, including other solid state light sources. The controller, in some embodiments, can store setting and identification information of each lighting fixture and can be capable of sending information to each lighting fixture using the wireless network. In some embodiments, the external wireless module can include a real time clock for controlling at least in part the illumination of the lighting fixture in accordance with stored settings representing times of day and brightness.

Other embodiments can be directed to a lighting fixture for illuminating a desired area or space. The lighting fixture can include a lighting fixture housing for installation in outdoor environments, an LED light engine having a plurality of LED devices that can be activated or dimmed in response to set time and date schedules to illuminate the desired area. An external wireless module can be mounted to the lighting fixture housing and can be used for communicating with a controller (e.g., a computing device) using a wireless network. In some embodiments, the external wireless module can include a real time clock for controlling at least in part the illumination of the lighting fixture in accordance with stored settings representing times of day and brightness. A back-up battery can be provided as part of the external wireless module to supply power to the real time clock in the event power to the fixture is lost.

As used herein, a "lighting fixture" or "luminaire" refers to a device used to provide light or illumination using one or more light sources. The use of the term "about" when used in conjunction with a numerical value is intended to refer to within 25% of the stated numerical value. "Generally perpendicular" means within 30° of perpendicular.

With reference now to the FIGS., example embodiments of the present disclosure will now be discussed in detail. Referring to FIG. 1, a lighting system 100 according to example embodiments of the present disclosure includes at least one lighting fixture 120. An external wireless module 200 can be coupled to an exterior of the lighting fixture 120. The system 100 can include a controller 130 that can be used to program or otherwise provide commands, instructions, or program code to each lighting fixture 120 via the external wireless module 200. The system 100 can include a wireless network 136 interconnecting each device within the lighting system 100.

In some embodiments, the lighting system 100 includes a plurality of lighting fixtures 120 as shown in FIG. 1. The lighting system 100 can also includes one or more sensors 138. Sensors 138 can include, for example, one or more light sensors, one or more motion sensors, or other suitable sensors. According to example embodiments of the present disclosure, the sensors 138 may be located external to the lighting fixtures 120 and can be used to control one or more lighting fixtures 120 via the wireless network 136. According to other example embodiments of the present disclosure, one or more sensors 138 can be incorporated in one or more of the lighting fixtures 120.

The controller 130 can be any suitable computing device or other device configured to program or to otherwise provide commands, instructions, or program code to each lighting fixture 120 via the wireless network 136. Examples of suitable controllers 130 include personal computers, mobile computing devices, such as a smartphone or tablets, or dedicated fixed or portable computing devices capable of providing real-time control and/or programming of one or more lighting fixtures 120 used to illuminate a desired area via an external wireless module 200. The controller 130 may communicate to the wireless network 136 through, for example, a bridge node. A non-limiting example of a suitable bridge node includes a USB wireless adapter, such as the SNAP Stick 200 USB dongle manufactured by Synapse. The wireless network 136 in some embodiments can be a mesh network. When communicating with individual wireless control modules 200 outside the mesh network, the lighting fixtures 120 can be controlled by the controller 130 when the controller 130 is in close proximity to wireless module 200 mounted to the lighting fixture 120 using, for example, the USB wireless adapter (e.g., the SNAP Stick 200 USB dongle) or other suitable communication device.

Communication between the nodes (e.g., controller 130, external wireless module(s) 200, sensor(s) 138, etc.) on the wireless network 136 can be achieved with a system having flexible addressing of the nodes, immunity to traffic storms, and efficient traffic throughput in a simple command and acknowledgement format. The wireless modules 200 and controller 130 can transmit and receive data packets that may contain several pieces of information. The format of the data packets can vary between command packets (e.g., from controller 130 to wireless module 200) or acknowledgement packets (e.g., from wireless module 200 to controller 130) or other suitable packets. Command packets may include at least the following, 1) an address, which can be an address of one or more nodes, or group of nodes, 2) a command code, 3) arguments for the command, and 4) an ID code identifying the data packet. Acknowledgement packets may include at least the following, 1) the address of the node sending the data packet (and the node may append addresses of other nodes which are replying with the same information), and 2) confirmation codes for all commands received. The acknowledgement packets may also include diagnostic data in response to a diagnostic command from the controller 130. Data packets may also include a hop count, indicating the number of intermediate devices through which the data packet passes. An external wireless module 200 may also initiate a command packet, for example, to alter other fixtures' dimming levels upon detection of motion. A wireless module initiated command packet might not require an acknowledgement packet, due to the non-criticality of an occasional missed packet. Finally, an external wireless module 200 whose real time clock has lost its time may initiate a packet to request the time and date information from a nearby fixture. The response packet causes all receiving wireless modules 200 not having the current time to update their real time clock, therefore these time recovery packets may use a simpler format which does not employ specific addresses and is limited to one hop.

Generally, to initiate communications, a user can enter a command within a user interface program 132 which may include a graphic user interface (GUI) running on the controller 130, and instructs the controller 130 to broadcast the command through the wireless network 136. The command may be directed to one particular lighting fixture 120 or to a group of lighting fixtures 120 via the wireless modules 200. The user interface program 132 may also log the commands in a list of outstanding commands. One or more wireless modules 200 may be configured as a repeater. Any wireless module 200 that is configured as a repeater and receives a data packet may rebroadcast the command if the data packet has remaining hops as set by the user. Wireless modules 200 may also be set as a repeater for fixture 120 in their own group only, in which case the wireless module 200 will rebroadcast the command to other modules 120 for lighting fixtures 120 and any sensors 138 in that group. The wireless modules 200 can, in some embodiments, maintain a queue of packet IDs received so the same packet is not retransmitted or executed twice, and the wireless module 120 will not retransmit or execute if the queue is full, thereby helping to minimize network traffic congestion. Once a command is received, the wireless module 200 executes the command if the wireless module 200 is included in the data packet's address string, or if the data packet is addressed to the group which includes the wireless module 200 or associated lighting fixture 120.

According to embodiments of the present disclosure, each external wireless module 200 includes a wireless communication module 250 (described later below) for communicating with controller 130 via wireless network 136. For each of the embodiments described herein, the signals sent to the wireless communication module 250 by the controller 130, via the wireless network 136, may include generally, user commands. These user commands include but are not limited to dim fixture (which may include turning light sources on and off), set schedule to automatically dim fixture, set sunrise or sunset times for astronomical time events which vary according to date, set fixture's group or name, or to set fixture's behavior upon one or more sensor responses. Acknowledgements and information requested by the controller 130 are sent from the wireless communication module 250 to the controller 130 via wireless network 136. This information may include diagnostic information from, for example, sensors, such as printed circuit board temperature; the number of kilowatt hours the lighting fixture 120 has been operating; real-time clock (RTC) time; and other information reflecting that one or more lighting fixture components are not functioning properly and are in need of repair, such as real-time clock status, etc. Signals sent to the controller 130 from the external wireless module 200 by the wireless communication module 250 via wireless network 136 may also include acknowledgments that commands from the controller 130 have been received.

Example methods for communicating information and/or command issuance from a controller to a wireless module are disclosed in U.S. Patent Application Publication No. 2015/0351205, which is incorporated herein by reference.

The GUI 132 provided on controller 130 can be used for adjusting the settings of an lighting fixture 120 via an external wireless module 200. The user interface program (GUI) can be implemented in, for instance, the Python language or other suitable computer-readable instructions. System information and lighting fixture 120 settings can be stored by the controller 130 in a file or database in one or more memory devices. Example aspects of an example GUI are disclosed in U.S. Patent Application Publication No. 2015/0351205, which is incorporated herein by reference.

Figure 2:
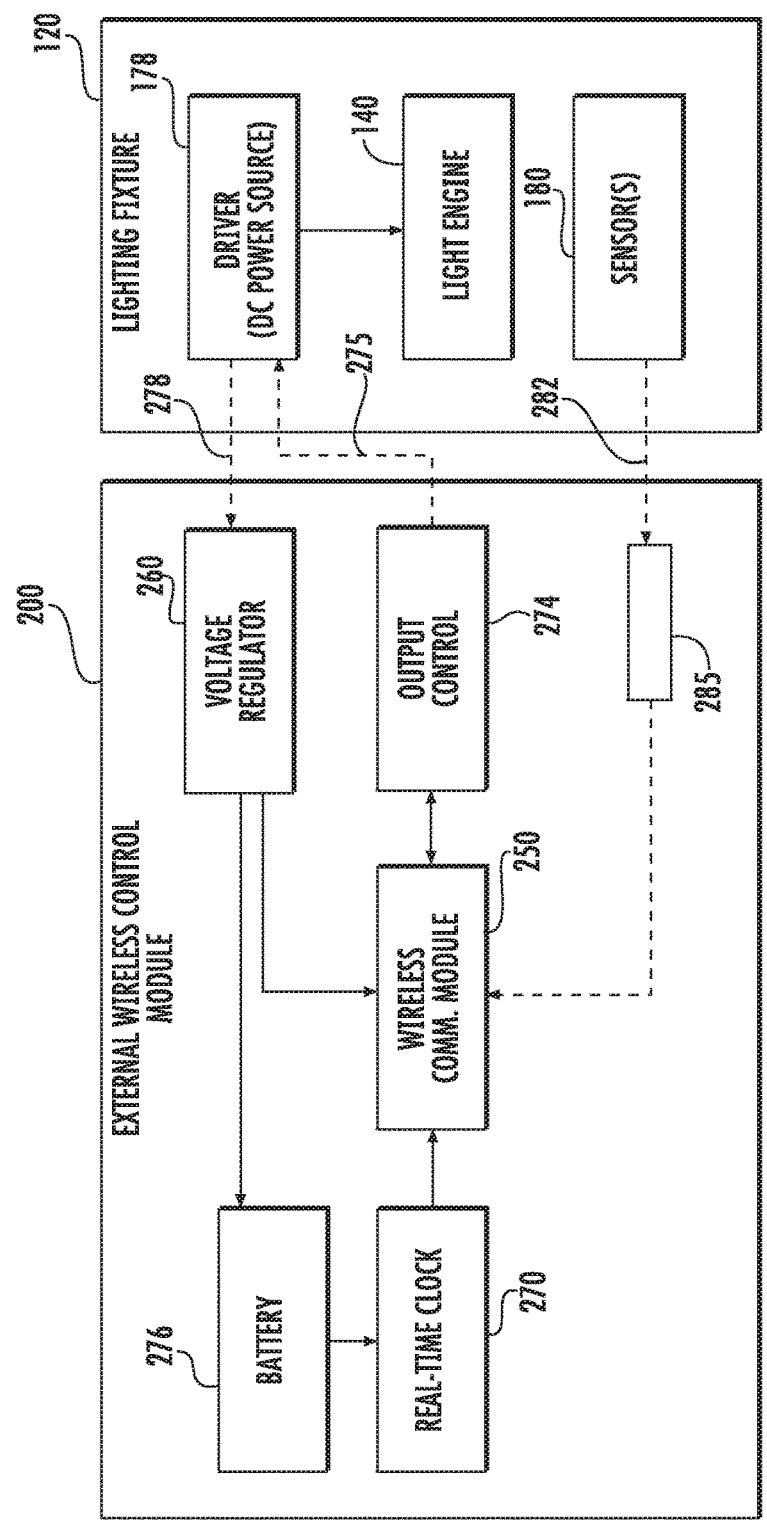
FIG. 2 depicts a block diagram of an example lighting fixture interfaced with an external wireless module according to example embodiments of the present disclosure.

FIG. 2 depicts a block diagram of an example lighting fixture 120 interfaced with an external wireless module 200 according to example embodiments of the present disclosure. Referring to FIG. 2, a lighting fixture 120 according to an embodiment of the present disclosure can include a light engine 140 (e.g., an LED light engine), and driver (or dc power supply) 178. The external wireless module 200 can include wireless communication module 250, a voltage regulator 260, a real-time-clock (RTC) 270, output control 274 (e.g., dimming output control), and battery back-up 276. The real time clock 270 and battery back-up 276 may be integrated into a single IC package.

The light engine 140 illuminates when energized by driver 178, and can be dimmed or brightened depending upon the voltage applied to the light engine 140 by the driver 178 under the control of the output control 274. According to an embodiment of the present disclosure, a suitable driver 178 can be a PLED series driver manufactured by Thomas Research Products. Another embodiment of a suitable driver 178 is shown in U.S. Patent Application Publication No. 2015/0351205, which is incorporated herein by reference.

The wireless communication module 250 can be configured to transmit signals to the controller 130 (seen in FIG. 1), and receive signals from the controller 130. The wireless communication module 250 can be located on a circuit board within a module housing of the external wireless module 200. The battery back-up 276 can supply power to the RTC 270 when power is otherwise unavailable to the RTC 270. The battery back-up 276 can allow for the RTC 270 to maintain accurate time so that the wireless communication module 250 can perform scheduled operations without the need to reprogram the RTC 270 in the event of power interruption.

Voltage regulator 260 can maintain a constant voltage supply, e.g., 3.3 volts, for the wireless communication module 250 and battery back-up 276. The voltage regulator 260 can be located on a circuit board within a module housing of the external wireless module 200 and can receive power from, for instance, the driver 178 of the lighting fixture 120 via one or more suitable conductors 278 extending between the external wireless module 200 and the lighting fixture 120 (e.g., a first power conductor and a second power conductor). The voltage regulator 260 can receive power from other sources of power from the lighting fixture 120 without deviating from the scope of the present disclosure.

Output control 274 can be configured to output lighting control signals (e.g., PWM signals, 0-10V control signals, or other lighting control signals) to driver 178 for controlling power to the light engine 140. The control signals can be provided to the driver or other aspects of a power circuit of the lighting fixture 178 via one or more conductors 275 extending between the external wireless module 200 and the lighting fixture 120 (e.g., a control conductor).

In some embodiments, the wireless module can be configured to receive signals from one or more sensor(s) 180. The sensor(s) 180 can be located or associated with the lighting fixture 120 or may include other sensor(s) (e.g., sensor(s) included as part of the external wireless control module). The sensor(s) 180 can include, for instance, one or more status sensors configured to measure certain operating characteristics of the lighting fixture 120 and may include temperature sensors, and sensors to measure current and voltage (including voltage and current levels of signals which are inputs for driving the light engine 140), etc. The sensor(s) can further include motion sensors, photosensors, or other sensors. Signals from the sensor(s) 180 can be communicated to the external wireless module 200 using a suitable conductor 282 extending between each of the one or more sensor(s) 180 and the external wireless module 200. The signals from the sensor(s) 180 can be communicated to the wireless communication module 250, via a suitable sensor interface circuit 285 (e.g., an analog-to-digital converter), for communication to the controller 130 (FIG. 1), for example, in response to a diagnostic data request from controller 130.

In some embodiments, the wireless communications module 250 includes one or more processors (e.g., a microprocessor or microcontroller) that controls the operation of the wireless communication module and provides wireless network capability as a transceiver to transmit and receive wireless signals. Wireless communication module 250 may include one or more discrete antennae or one or more built in antennae. The antenna physically transmits and receives wireless signals. In some embodiments, the wireless communication module 250 communicates in the 2.4 GHz band using IEEE 802.15.4 protocol, however, other antennas (including on-board antennas), data rates and frequencies are also contemplated by the present disclosure.

The antenna can be built onto a circuit board containing the wireless communication module 250. In some embodiments, the antenna is a chip based antenna, or an "F" trace antenna built into the wireless communication module 250. Examples of suitable wireless communication modules can include the SM220 RF Engines® manufactured by Synapse. The Synapse's SM220 RF Engines® are IEEE 802.15.4, surface mount modules communicating in the 2.4 GHz band and reaching data rates up to 2 Mbps. The SM220 RF Engines® can come pre-loaded with a SNAP® mesh network operating system and provide interoperability with other SNAP RF Engines. The Model SM220 embeds Synapse's SNAP OS, an Internet-enabled, wireless mesh network operating system into a single microcontroller chip with an integrated transceiver. As noted, the SM220 is capable of executing a SNAP® network operating system, which would allow multiple external wireless modules 200 (also called "nodes" in this context) to communicate in a mesh network, where any node can communicate to or through any node which is in range of the wireless modules 250 transmission capabilities. The SNAP® network operating system has an on-board Python language interpreter that permits rapid application development and over-the-air programming, while lowering the manufacturing costs of the external wireless module 200. The SNAP format allows for inclusion of Python-coded script to be loaded onto each module, for execution of the particular application (i.e. lighting control).

Example circuits for implementing the above-mentioned components of the lighting fixture 120 and the external wireless control module 200 are disclosed in U.S. Patent Application Publication No. 2015/0351205, which is incorporated herein by reference.

Figure 3:
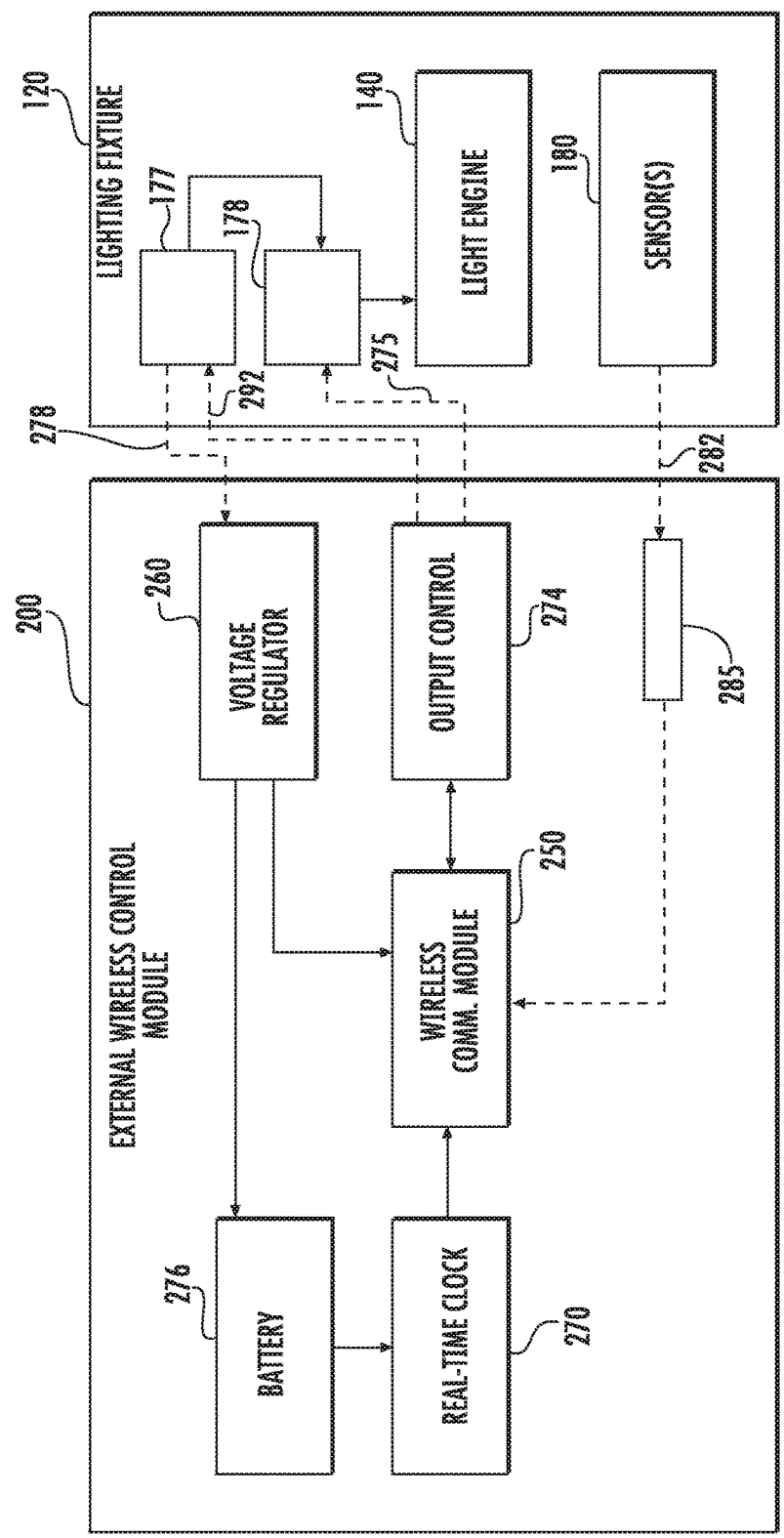
FIG. 3 depicts a block diagram of an example lighting fixture interfaced with an external wireless module according to example embodiments of the present disclosure.

FIG. 3 depicts a block diagram of an example lighting fixture 120 interfaced with an external wireless module 200 according to other example embodiments of the present disclosure. The external wireless module 200 of FIG. 3 is similar to that of FIG. 2, except that it includes an additional output conductor 292 (e.g., wire or lead) used to drive a relay 177 included as part of the lighting fixture 120 to turn the lighting fixture 120 on and off. The relay 177 can be used as a power source separate from the driver 178. In some embodiments, the relay 177 can be a part of a power pack (e.g., an NX fixture controller manufactured by Hubbell Incorporated).

Figure 4:
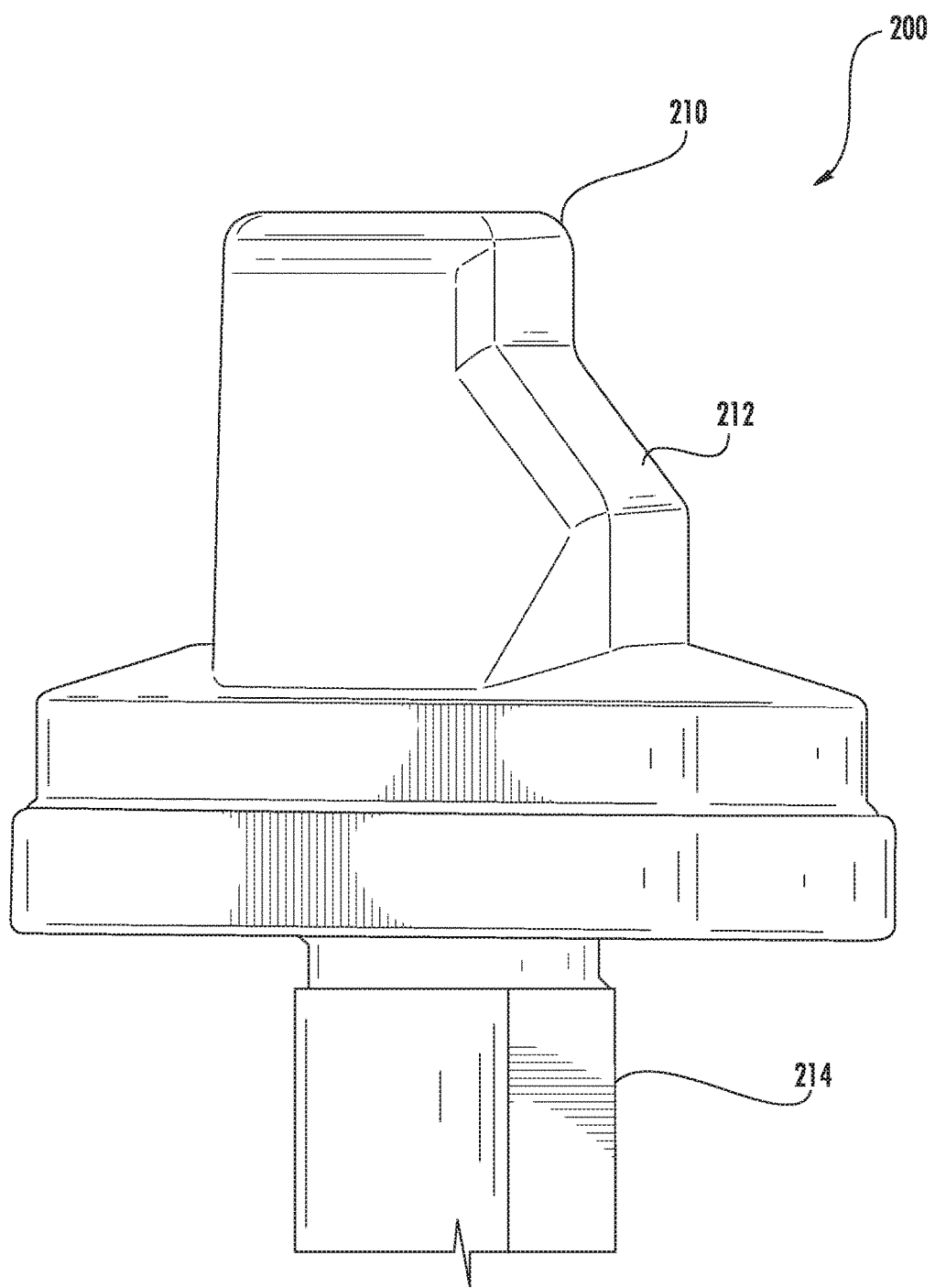
FIG. 4 depicts a perspective view of an example external wireless module according to example embodiments of the present disclosure.

FIG. 4 depicts a perspective view of an example external wireless module 200 according to example embodiments of the present disclosure. The internal components (e.g., the components illustrated in FIG. 2) of the external wireless module 200 can be enclosed by a module housing 210. The module housing 210 can protect the internal components of the external wireless module 200 from external elements (e.g., weather, vandalism, etc.). The module housing 210 can be made from plastic or other suitable material. In some embodiments, the module housing 210 is made from a dielectric material so that wireless communication can be accomplished through the housing 210 with reduced interference.

As shown, in FIG. 4, the module housing 210 can include a first housing portion 212 and a second housing portion 214. The first housing portion 212 and the second housing portion 214 can be secured together using a suitable attachment mechanism (e.g., screws, fasteners, etc.). The first housing portion 212 and the second housing portion 214 can define an internal compartment for housing internal components of the external wireless module 200. The first housing portion 212 and the second housing portion 214 can be separated from one another to access the internal components of the external wireless module 200.

Figure 5:
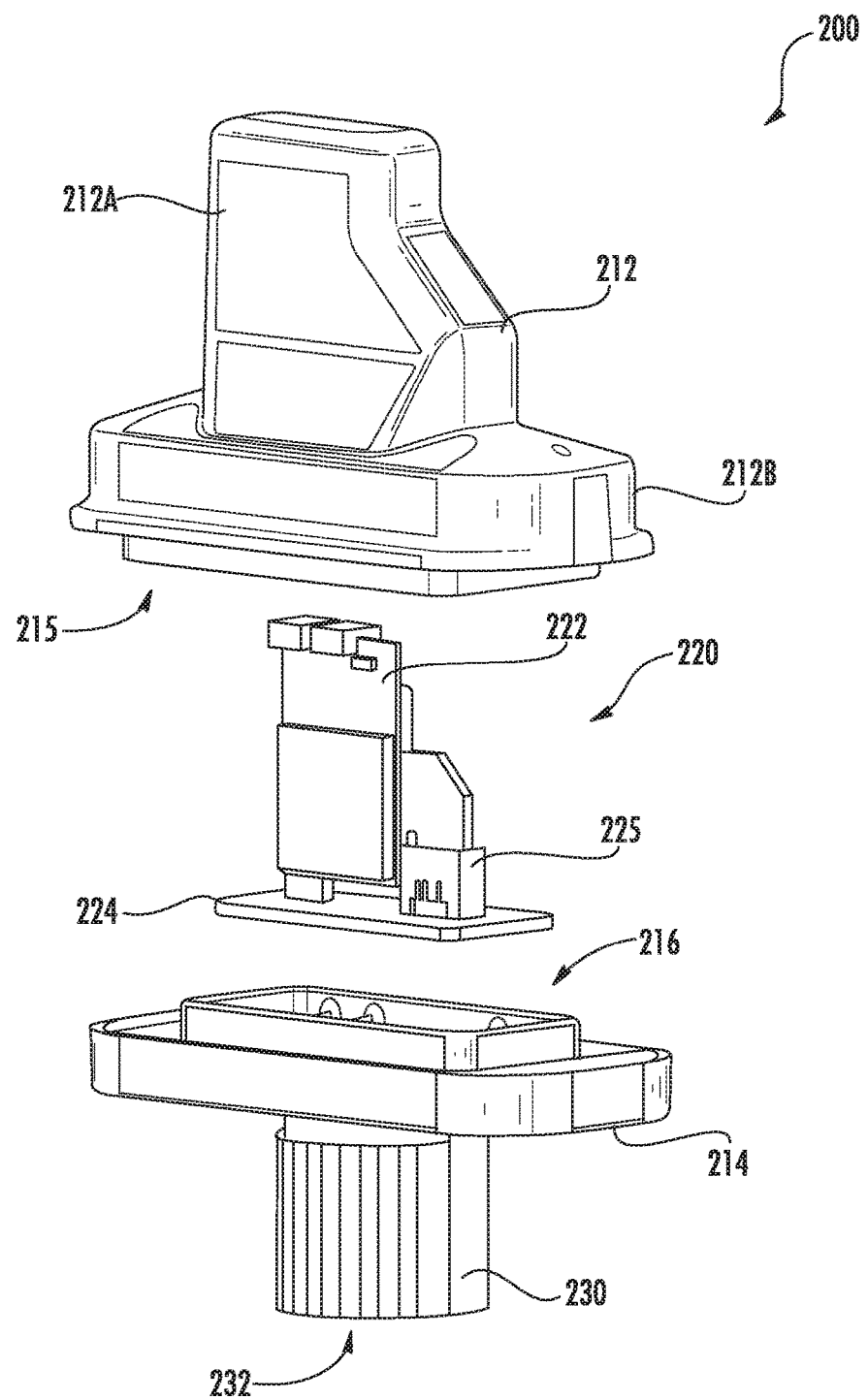
FIG. 5 depicts internal components of an example external wireless module according to example embodiments of the present disclosure.

For instance, FIG. 5 depicts electrical components 220 of an example external wireless control module 200 according to example embodiments of the present disclosure. The electrical components 220 can include, for instance, one or more of the battery 276, real-time clock 270, wireless communication module 250, voltage regulator 260, and output control 274 discussed with respect to FIG. 2. The electrical components 220 can implemented on a first circuit board 222 and a second circuit board 224 coupled together with a suitable connector 225. In other implementations, the electrical components 220 can be implemented using a single circuit board or multiple circuit boards (e.g., three circuit boards, four circuit boards, etc.).

In some embodiments, the first board 222 can include communication circuitry (e.g., one or more transmitters, receivers, transceivers, antenna, etc.) as well as one or more processors or other control circuitry (e.g., microprocessors, microcontrollers, application specific integrated circuits, etc.) for controlling the communication circuitry to provide wireless network capability and to transmit and receive wireless signals. The first board 222 can further include components such as a real time clock, back-up battery, and other components to assist with adapting a lighting fixture for wireless control capability. For instance, in some embodiments, the first board 222 can include the battery 276, the real-time clock 270, and the wireless communication module 250 shown in FIG. 2.

The second board 224 of FIG. 5 can include circuitry configured to receive a power supply from the lighting fixture (e.g., via suitable conductors) as well as generate control signals for operation of the driver circuit and/or light engine of the lighting fixture (e.g., via one or more control conductors). For instance, in some embodiments, the second board 224 can include the voltage regulator 260 and the output control 274 of FIG. 2.

As shown in FIG. 5, in some embodiments, the first board 222 can be arranged in generally perpendicular (i.e., transversely) relative to the second board 225. Arranging the first board 222 and the second board 225 in this manner can allow for an antenna included as part of the first board 222 to be situated a distance (e.g., about an inch) away from the plane of the second board 224 and to increase its communication capability with the external environment and to facilitate receiving and transmitting of radio waves while protected by enclosure 210. In some embodiments, the first board 222 can be plugged into the second board 224 via a card edge-type or other suitable connector 225.

The first housing portion 212 can define an interior space 215 configured to accommodate at least a portion of the first board 222. For instance, the first housing portion 212 can have a vertical portion 212A that extends from a horizontal portion 212B. The vertical portion 212A can define an interior space that accommodates the first board 222 as well as connector 225. The horizontal portion 212B can define an interior space that accommodates the second board 224.

The second housing portion 214 can include a connecting portion 230 that is configured to engage an exterior housing of a lighting fixture to secure the external wireless module 220 to the lighting fixture. In some embodiments, the connecting portion 230 can be a mounting nipple (e.g., a ½" nipple) that can be secured to the external housing of the lighting fixture via a lock nut or other suitable securing mechanism. Conductors (e.g., wires) for power and/or control can pass through an opening 232 in the second housing portion 214 for coupling to the electrical components 220. For instance, conductors 278, 275, 282 and/or 292 can pass through opening 232 for coupling to the electrical components 220 of the external wireless module 200.

A gasket (not illustrated) can be disposed between the first housing portion and the second housing portion for exclusion of moisture. A gasket (not illustrated) can be disposed between a bottom surface of the horizontal portion of the second housing portion 214 and the lighting fixture. In some embodiments, the second housing portion 214 can include ribs to act as gasket compression stops.

Figure 6:
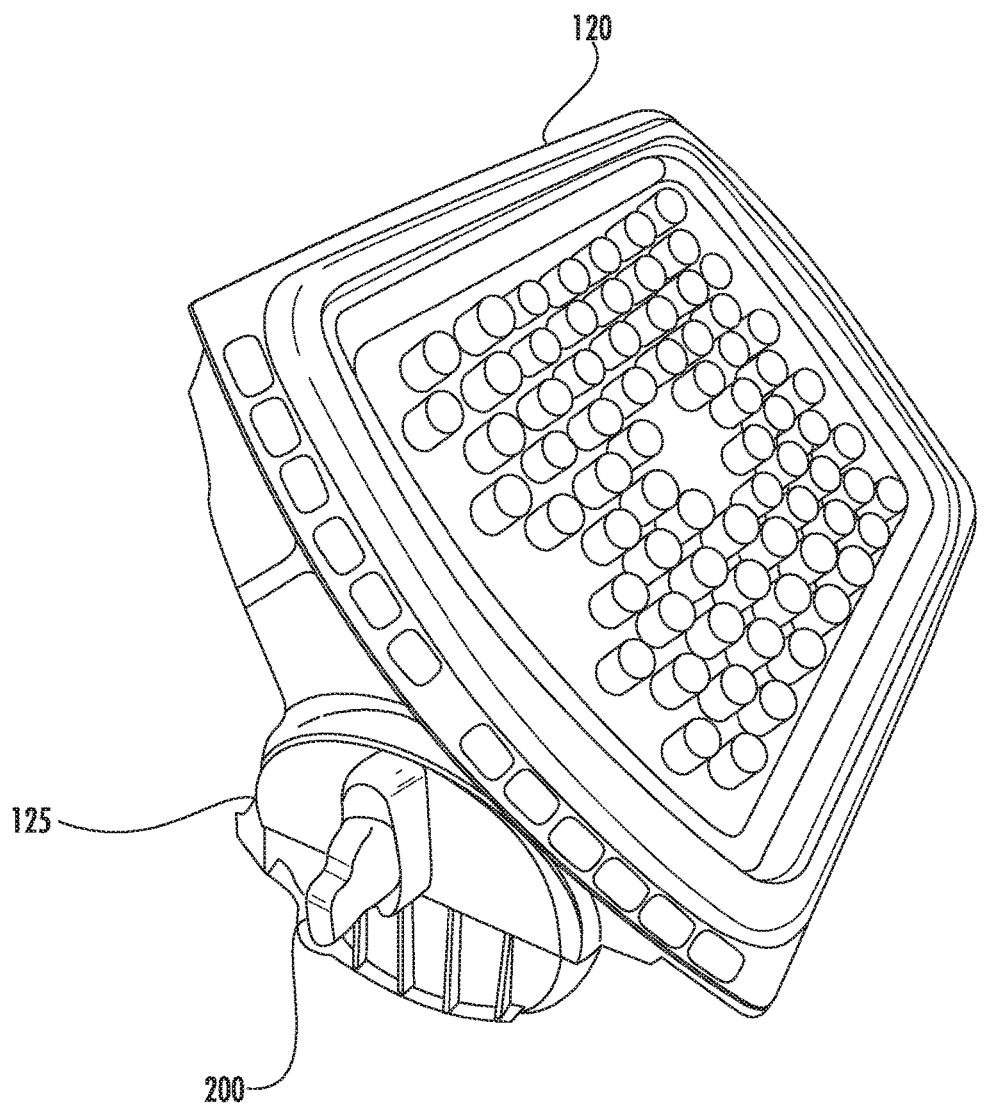
FIG. 6 depicts an example external wireless module coupled to an example lighting fixture according to example embodiments of the present disclosure.

FIG. 6 depicts an example external wireless module 200 mounted to a lighting fixture 120 (e.g., a floodlight) according to example aspects of the present disclosure. More particularly, the external wireless module 200 is mounted to an external housing 125 of the lighting fixture 120. FIG. 6 depicts on example type of lighting fixture 200 (e.g., a floodlight) for purposes of illustration and discussion. Those of ordinary skill in the art, using the disclosures provided herein, will understand that the external wireless module can be mounted and/or interface with other suitable lighting fixtures without deviating from the scope of the present disclosure.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An external wireless module for mounting to a lighting fixture, comprising:
    a module housing;
    a plurality of electrical components located within the module housing, the plurality of electrical components configured to provide wireless control capability for the lighting fixture over a wireless network;
    wherein the module housing is configured to be mounted to an exterior of a lighting fixture housing associated with the light fixture and the plurality of electrical components are configured to be interfaced with one or more internal components of the lighting fixture located in an interior of the lighting fixture housing;
    wherein the plurality of electrical components comprises a real time clock and a back-up battery, the real time clock used for controlling illumination of the lighting fixture based at least in part on time of day, the back-up battery configured to provide power to the real time clock.

2. The external wireless module of claim 1, wherein the plurality electrical components comprise a wireless communication module.

3. The external wireless module of claim 1, wherein the one or more internal components of the lighting fixture comprise a driver.

4. The external wireless module of claim 3, wherein the lighting fixture comprises a light engine having one or more light emitting diode (LED) devices.

5. The external wireless module of claim 1, wherein the plurality of electrical components are arranged on a first circuit board and a second circuit board.

6. The external wireless module of claim 5, wherein the first circuit board is arranged generally perpendicular to the second circuit board.

7. The external wireless module of claim 5, wherein the first circuit board comprises a wireless communication module and the second circuit board comprises one or more of a voltage regulator and an output control.

8. The external wireless module of claim 5, wherein module housing comprises:
a first housing portion having an internal space configured to accommodate the first board; and
the second housing portion has a connecting portion for connecting the external wireless module to the lighting fixture.

9. The external wireless module of claim 8, wherein the one or more electrical components are interfaced with one or more internal components of the lighting fixture via one or more conductors extending between the external wireless module and the lighting fixture, the one or more conductors extending through an opening defined in the connecting portion.

10. The external wireless module of claim 8, wherein the first housing portion is separable from the second housing portion.

11. The external wireless module of claim 1, wherein the one or more electrical components are interfaced with one or more internal components of the lighting fixture via one or more conductors extending between the external wireless module and the lighting fixture.

12. The external wireless module of claim 1, wherein the external wireless module is configured to receive control signals from a controller via a wireless network and control the lighting fixture based at least in part on the control signals.

13. A lighting fixture system, comprising:
a lighting fixture housing;
a driver located within the lighting fixture housing;
a light source located within the lighting fixture housing; and
an external wireless module mounted to the exterior of the lighting fixture housing, the external wireless module comprising a plurality of electrical components associated with wireless control capability;
wherein the plurality of electrical components are interfaced with the driver located within the lighting fixture housing;
wherein the plurality of electrical components comprises a real time clock and a back-up battery, the real time clock used for controlling illumination of the lighting fixture based at least in part on time of day, the back-up battery configured to provide power to the real time clock.

14. The lighting fixture of claim 13, wherein the external wireless module is configured to receive a control signal via a wireless network and control the driver based at least in part on the control signal.

15. The lighting fixture of claim 14, wherein the external wireless module is configured to dim the light source in response to the control signal.

16. The lighting fixture of claim 13, wherein the plurality of electrical components are interfaced with the driver of the lighting fixture via one or more conductors extending between the external wireless module and the lighting fixture.

* * * * *